United States Patent
Guo

(10) Patent No.: US 9,590,773 B2
(45) Date of Patent: Mar. 7, 2017

(54) METHOD AND RELATED APPARATUS FOR SETTING PACKET HEADERS IN A WIRELESS COMMUNICATIONS SYSTEM

(75) Inventor: Yu-Hsuan Guo, Taipei (TW)

(73) Assignee: INNOVATIVE SONIC LIMITED, Eben (MU)

( * ) Notice: Subject to any disclaimer, the term of this patent is extended or adjusted under 35 U.S.C. 154(b) by 609 days.

(21) Appl. No.: 12/121,807

(22) Filed: May 16, 2008

(65) Prior Publication Data
US 2008/0285567 A1 Nov. 20, 2008

Related U.S. Application Data

(60) Provisional application No. 60/938,705, filed on May 18, 2007.

(51) Int. Cl.
*H04L 12/28* (2006.01)
*H04L 1/18* (2006.01)
*H04L 1/16* (2006.01)

(52) U.S. Cl.
CPC ............ *H04L 1/187* (2013.01); *H04L 1/1607* (2013.01)

(58) Field of Classification Search
USPC ....... 370/328, 392, 470, 342, 349, 394, 310, 370/338; 455/428, 466
See application file for complete search history.

(56) References Cited

U.S. PATENT DOCUMENTS

| | | | |
|---|---|---|---|
| 6,947,394 B1 * | 9/2005 | Johansson | H04L 1/1685 370/252 |
| 7,130,295 B2 * | 10/2006 | Kim et al. | 370/349 |
| 7,391,758 B2 * | 6/2008 | Matusz | 370/349 |
| 7,400,893 B2 * | 7/2008 | Yi et al. | 455/466 |
| 7,817,669 B2 * | 10/2010 | Pani | H04L 1/0007 370/465 |
| 7,894,443 B2 * | 2/2011 | Malkamaki | 370/394 |
| 7,949,012 B2 * | 5/2011 | Chang | H04L 63/0428 370/349 |

(Continued)

FOREIGN PATENT DOCUMENTS

| | | |
|---|---|---|
| JP | 2002125004 A | 4/2002 |
| KR | 1020070033297 | 3/2007 |

(Continued)

OTHER PUBLICATIONS

3GPP TS 25.322 V7.2.0 (Sep. 2006), "Radio Link Control (RLC) Protocol Specification (Release 7)".

(Continued)

*Primary Examiner* — Edan Ograd
*Assistant Examiner* — Emmanuel Maglo
(74) *Attorney, Agent, or Firm* — Blue Capital Law Firm, P.C.

(57) ABSTRACT

A method for setting a header, having a header extension type field, of a protocol data unit in a radio link control layer of a wireless communications system includes configuring a "use of the special value of the header extension type field" mode, and setting the header extension type field to indicate that a last octet of the protocol data unit is a last octet of a service data unit when the last octet of the protocol data unit is the last octet of the service data unit and there is no concatenation of service data units inside the protocol data unit.

8 Claims, 4 Drawing Sheets

(56) References Cited

U.S. PATENT DOCUMENTS

| | | | | |
|---|---|---|---|---|
| 8,073,013 | B2* | 12/2011 | Coleman | G06Q 30/02 370/486 |
| 8,228,869 | B2* | 7/2012 | Ahluwalia | H04L 1/1874 370/331 |
| 2002/0042270 | A1* | 4/2002 | Yi | 455/424 |
| 2002/0048281 | A1* | 4/2002 | Yi et al. | 370/474 |
| 2002/0196760 | A1* | 12/2002 | Malomsoky | H04L 47/10 370/338 |
| 2003/0007480 | A1* | 1/2003 | Kim | H04L 1/1812 370/349 |
| 2004/0057423 | A1* | 3/2004 | Beckmann | H04L 1/1614 370/352 |
| 2006/0067238 | A1* | 3/2006 | Olsson et al. | 370/242 |
| 2006/0072494 | A1* | 4/2006 | Matusz | 370/328 |
| 2006/0251105 | A1* | 11/2006 | Kim et al. | 370/449 |
| 2006/0281413 | A1 | 12/2006 | Burbidge | |
| 2007/0047582 | A1* | 3/2007 | Malkamaki | 370/470 |
| 2007/0064599 | A1 | 3/2007 | Jiang | |
| 2007/0064600 | A1 | 3/2007 | Jiang | |
| 2007/0064601 | A1 | 3/2007 | Jiang | |
| 2007/0064602 | A1 | 3/2007 | Jiang | |
| 2007/0110101 | A1 | 5/2007 | Wu | |
| 2007/0183328 | A1* | 8/2007 | Jiang | 370/232 |
| 2007/0201424 | A1* | 8/2007 | Kobayashi et al. | 370/349 |
| 2008/0043651 | A1* | 2/2008 | Okamoto | H04L 1/1835 370/310 |
| 2008/0069142 | A1 | 3/2008 | Wu | |
| 2008/0141097 | A1* | 6/2008 | Vayanos et al. | 714/755 |
| 2008/0186936 | A1* | 8/2008 | Chun et al. | 370/342 |
| 2008/0192748 | A1* | 8/2008 | Kim et al. | 370/394 |
| 2008/0212561 | A1 | 9/2008 | Pani | |
| 2008/0310345 | A1* | 12/2008 | Chun et al. | 370/328 |
| 2009/0028126 | A1 | 1/2009 | Meylan | |
| 2010/0014446 | A1* | 1/2010 | Chun et al. | 370/310 |

FOREIGN PATENT DOCUMENTS

| | | |
|---|---|---|
| KR | 1020080073440 | 8/2008 |
| WO | 2005/109778 A1 | 11/2005 |
| WO | 2006118418 A2 | 11/2006 |
| WO | WO 2007023364 A1 | 3/2007 |
| WO | 2005048517 A1 | 3/2010 |

OTHER PUBLICATIONS

R2-072280, "Using special value of HE field to indicate end of an SDU for RLC AM", Ericsson, Nokia, NSN, Samsung, 3GPP TSG-RAN WG2#58, May 7, 2007.

R2-072308, "Introduction of improved L2 support for high data rates", Ericsson, 3GPP TSG-RAN WG2#57, Feb. 12-16, 2007.

3GPP: "ETSI TS 125 322 V7.4.0 (Oct. 2007) Universal Mobile Telecommunications System (UMTS); Radio Link Control (RLC) protocol specification (3GPP TS 25.322 version 7.4.0 Release 7)" ETSI Standards, Lis, Sophia Antipolis Cedex, France, vol. 3-R2, No. V7.4.0, XP014040006, Oct. 1, 2007.

Asustek: "R2-072420; Correction on POLL SUFI" 3GPP TSG-RAN WG2 Meeting #58BIS, [Online], Jun. 25, 2007-Jun. 29, 2007, pp. 1-5, XP002495307, Orlando, USA.

Asustek: "R2-073099; Correction on POLL SUFI" 3GPP TSG-RAN WG2 Meeting #59, [Online], Aug. 20, 2007-Aug. 24, 2007, pp. 1-4, XP002495308, Athens, Greece.

Notice of Allowance on corresponding JP patent application No. 2008-130161 issued on Jan. 4, 2011.

Notice of Allowance on corresponding JP patent application No. 2008-130160 issued on Dec. 22, 2010.

"Universal Mobile Telecommunications System (UMTS); Radio Link Control (RLC) protocol specification (3GPP TS 25.322 version 7.2.0 Release 7); ETSI TS 125 322", Sep. 1, 2006, vol. 3-R2, No. V7.2.0, XP014035578, ISSN: 0000-0001, ETSI Standards, Lis, Sophia Antipolis Cedex, France.

"Universal Mobile Telecommunications System (UMTS); Radio Link Control (RLC) protocol specification (3GPP TS 25.322 version 7.3.0 Release 7); ETSI TS 125 322", Jun. 1, 2007, vol. 3-R2, No. V7.3.0, XP014040005, ISSN: 0000-0001, ETSI Standards, Lis, Sophia Antipolis Cedex, France.

Asustek, "R2-072421, Special He value setting" 3GPP TSG-RAN WG2 Meeting #58bis, [Online], Jun. 25-29, 2007, pp. 1-3, XP002503779, Orlando, USA.

Asustek, "R2-073101, Special HE value setting" 3GPP TSG-RAN WG2 Meeting #59, [Online], Aug. 20-24, 2007, pp. 1-3, XP002503780, Athens, Greece.

"Universal Mobile Telecommunications System (UMTS); Radio Link Control (RLC) protocol specification (3GPP TS 25.322 version 7.4.0 Release 7); ETSI TS 125 322", Oct. 1, 2007, vol. 3-R2, No. V7.4.0, XP014040006, ISSN: 0000-0001, ETSI Standards, Lis, Sophia Antipolis Cedex, France.

* cited by examiner

METHOD AND RELATED APPARATUS FOR SETTING PACKET HEADERS IN A WIRELESS COMMUNICATIONS SYSTEM

CROSS REFERENCE TO RELATED APPLICATIONS

This application claims the benefit of U.S. Provisional Application No. 60/938,705, filed on May 18, 2007 and entitled "Method and apparatus for POLL SUFI and special value of HE field clarifications in a wireless communication system", the contents of which are incorporated herein by reference.

BACKGROUND OF THE INVENTION

1. Field of the Invention

The present invention relates to a method and apparatus for setting packet headers in a wireless communications system, and more particularly, to a method and apparatus for reducing overhead, and preventing a receiver from wrongly reassembling Service Data Units.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates.

The access stratum of the 3G mobile telecommunications system comprises a radio resource control (RRC), radio link control (RLC), media access control (MAC), packet data convergence protocol (PDCP), broadcast/multicast control (BMC) and other sub-layers of different functions. The operations of the above-mentioned sub-layers are well known for those skilled in the art, and will not be further mentioned. A primary function of the RLC layer is providing different transmission quality processing, performing segmentation, reassembly, concatenation, padding, retransmission, sequence check, and duplication detection on transmitted data or control instructions based on different transmission quality requirements. The MAC layer can match packets received from different logic channels of the RLC layer to common, shared, or dedicated transport channels according to radio resource allocation commands of the RRC layer, for performing channel mapping, multiplexing, transport format selection, or random access control.

When the RLC layer operates in an acknowledged mode (AM), a header of an RLC PDU (Protocol Data Unit) comprises a two-bit HE (Header Extension Type) field utilized for indicating if the next octet is data or a Length Indicator (LI) and Extension (E) bit. The HE field has different values, and the corresponding description is as follows:

1. "00": The succeeding octet contains data.
2. "01": The succeeding octet contains LI and E bit.
3. "10" and "11": Reserved. PDUs with this coding represents that a protocol error is occurred, and the PDUs will be discarded.

In order to decrease overhead, the prior art can configure a "use of the special value of the HE field" mode to set "10" of the HE field to indicate that the succeeding octet contains data and the last octet of the corresponding PDU is the last octet of an SDU (Service Data Unit). In other words, in the "use of the special value of the HE field" mode, if a PDU carries either a complete SDU or a segment of a SDU, and the complete SDU or the segment of the SDU ends at the end of the PDU, the HE field of the PDU will be set to "10." As a result, an extra PDU carrying the corresponding LI is not needed, to decrease overhead.

Therefore, after the "use of the special value of the HE field" mode is configured, if a HE field of a PDU equals "10", it implies that there is no SDU concatenation inside the PDU. However, the condition for setting the HE field to the special value is incorrect in the prior art as follows: if the last octet of a PDU is the last octet of an SDU, and the "use of the special value of the HE field" has been configured by higher layers, set the HE field to indicate that the last octet of the PDU is the last octet of an SDU. In such a situation, even if there are concatenated SDUs inside the PDU, the prior art still sets the HE field of the PDU to indicate that the last octet of the PDU is the last octet of an SDU. In other words, the receiver will consider the concatenated SDUs as the same SDU, and reassemble the SDUs incorrectly.

In short, the prior art does not precisely specify the condition for setting the HE field to the special value, leading the receiver to wrongly reassemble the SDUs, and causing system malfunction.

SUMMARY OF THE INVENTION

According to the claimed invention, a method for setting a header, having a header extension type field, of a protocol data unit in a radio link control layer of a wireless communications system comprises configuring a "use of the special value of the header extension type field" mode, and setting the header extension type field to indicate that a last octet of the protocol data unit is a last octet of a service data unit when the last octet of the protocol data unit is the last octet of the service data unit and there is no concatenation of service data units inside the protocol data unit.

According to the claimed invention, a communications device for accurately setting a header, having a header extension type field, of a radio link control protocol data unit in a wireless communications system comprises a control circuit for realizing functions of the communications device, a processor installed in the control circuit, for executing a program code to command the control circuit, and a memory installed in the control circuit and coupled to the processor for storing the program code. The program code comprises configuring a "use of the special value of the header extension type field" mode, and setting the header extension type field to indicate that a last octet of the radio link control protocol data unit is a last octet of a service data unit when the last octet of the radio link control protocol data unit is the last octet of the service data unit and there is no concatenation of service data units inside the radio link control protocol data unit.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
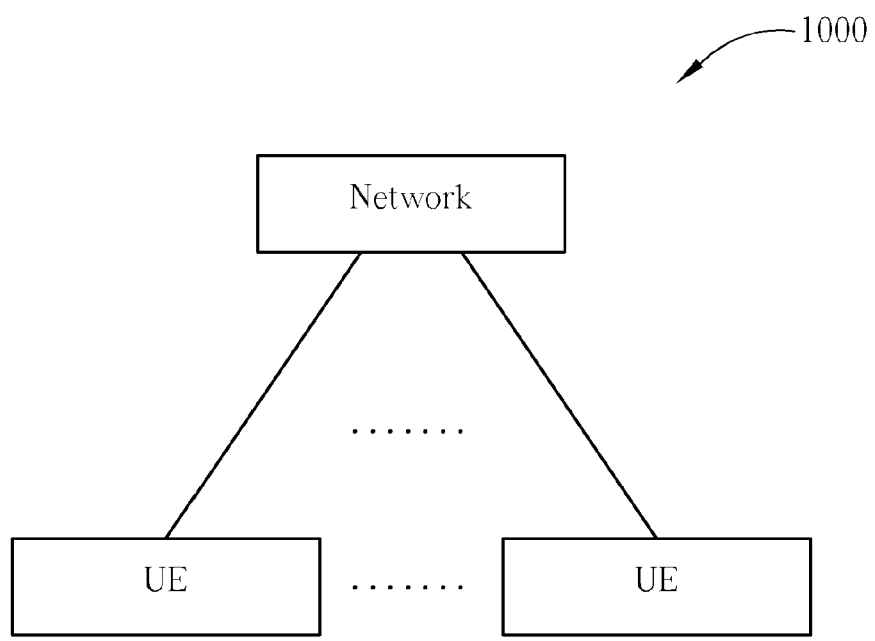
FIG. 4 is a schematic diagram of a wireless communications system.

Please refer to FIG. 4, which illustrates a schematic diagram of a wireless communications system 1000. The wireless communications system 1000 can be a 3G mobile telecommunications system, an LTE (long-term evolution) system or other mobile communications systems, and is briefly composed of a network and a plurality of UEs. In FIG. 4, the network and the UEs are simply utilized for illustrating the structure of the wireless communications system 1000. Practically, the network may comprise a plurality of base stations (Node Bs), radio network controllers and so on according to actual demands, and the UEs can be devices such as mobile phones, computer systems, etc.

Figure 1:
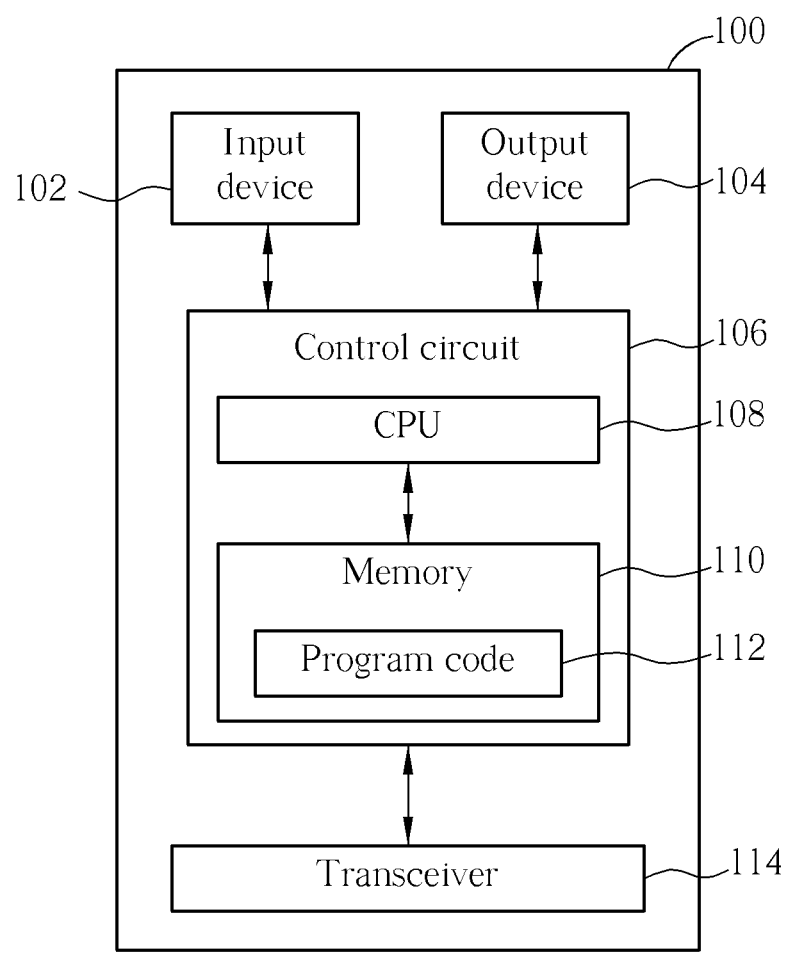
FIG. 1 is a function block diagram of a wireless communications device.

Please refer to FIG. 1, which is a functional block diagram of a wireless communications device 100. The communications device 100 is utilized for realizing the network or the UEs in FIG. 4. For the sake of brevity, FIG. 1 only shows an input device 102, an output device 104, a control circuit 106, a central processing unit (CPU) 108, a memory 110, a program code 112, and a transceiver 114 of the wireless communications device 100. In the wireless communications device 100, the control circuit 106 executes the program code 112 in the memory 110 through the CPU 108, thereby controlling an operation of the wireless communications device 100. The wireless communications device 100 can receive signals input by a user through the input device 102, such as a keyboard, and can output images and sounds through the output device 104, such as a monitor or speakers. The transceiver 114 is used to receive and transmit wireless signals, transmitting received signals to the control circuit 106, and outputting signals generated by the control circuit 106 wirelessly. From a perspective of a communications protocol framework, the transceiver 114 can be seen as a first portion of a first layer, and the control circuit 106 can be utilized to realize functions of a second layer and a third layer.

Figure 2:
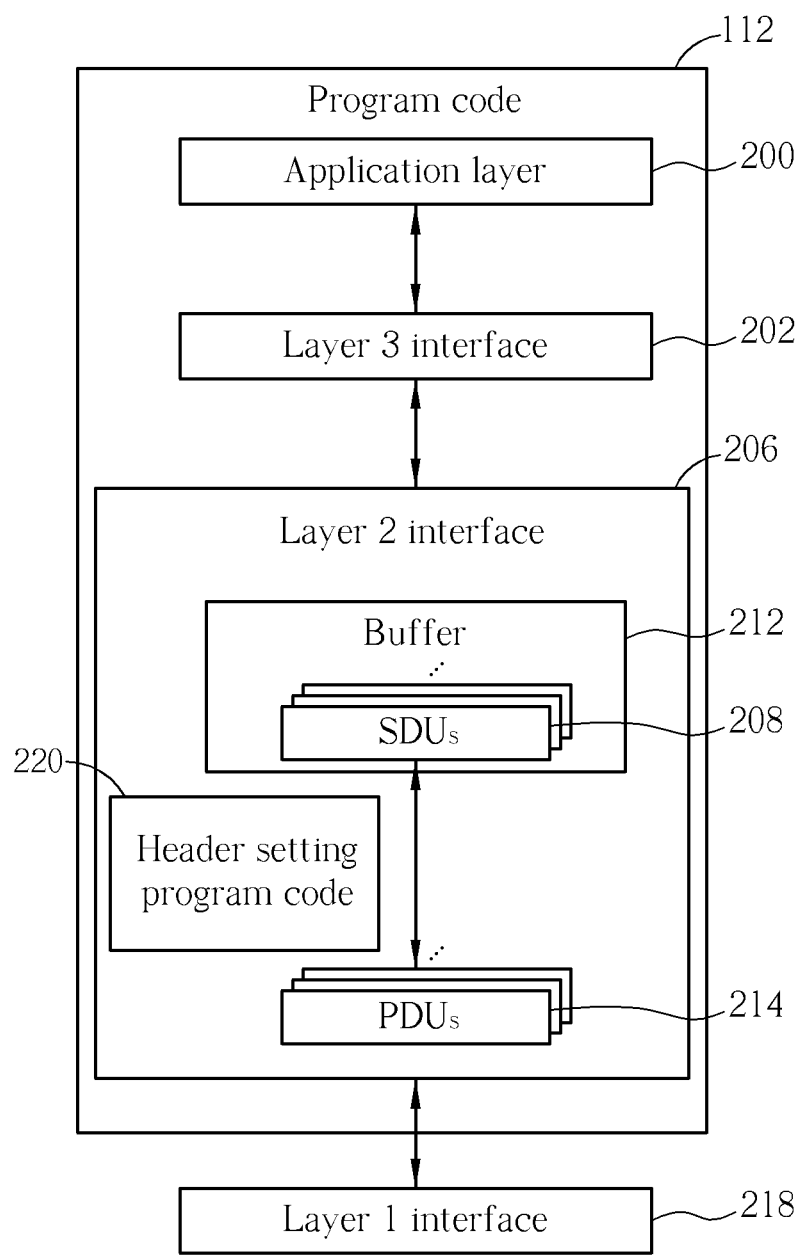
FIG. 2 is a diagram of program code of FIG. 1.

Please continue to refer to FIG. 2. FIG. 2 is a diagram of the program code 112 shown in FIG. 1. The program code 112 comprises an application layer 200, a Layer 3 interface 202, and a Layer 2 interface 206, and is coupled to a Layer 1 interface 218. When a signal is transmitted, the Layer 2 interface 206 forms a plurality of SDUs 208 according to data outputted by the Layer 3 interface 202, and stores the plurality of SDUs 208 in a buffer 212. Then, based on the SDUs 208 stored in the buffer 212, the Layer 2 interface 206 generates a plurality of PDUs 214, and sends the plurality of PDUs 214 to a destination terminal through the Layer 1 interface 218. In contrast, when a wireless signal is received, the signal is received through the Layer 1 interface 218, then outputted as PDUs 214 to the Layer 2 interface 206. The Layer 2 interface 206 restores the PDUs 214 to SDUs 208 and stores the SDUs 208 in the buffer 212. Last, the Layer 2 interface 206 transmits the SDUs 208 stored in the buffer 212 to the Layer 3 interface 202.

When the communications device 100 operates in AM, a header of a PDU 214 comprises a two-bit HE field utilized for indicating if the next octet is data or an LI and E bit. When the "use of the special value of the HE field" mode is configured, a reserved value of the HE field represents that the succeeding octet contains data and the last octet of the corresponding PDU is the last octet of an SDU. In such a situation, the embodiment of the present invention provides a header setting program code 220, for accurately setting the value of the HE field.

Figure 3:
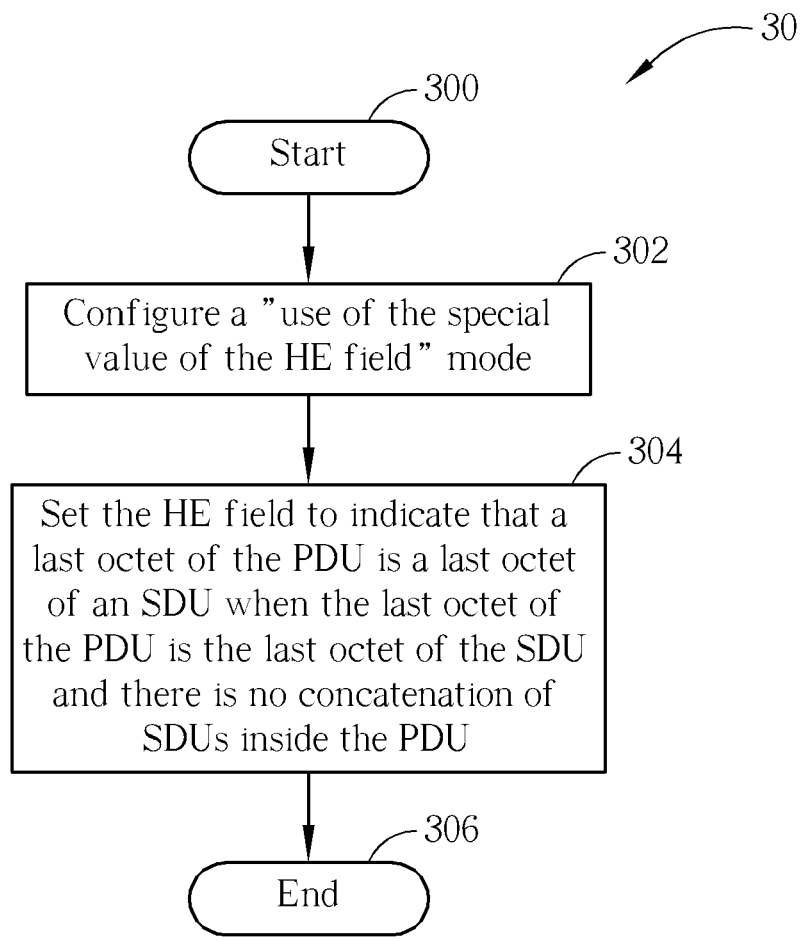
FIG. 3 is a flowchart of a process according to an embodiment of the present invention.

Please refer to FIG. 3, which illustrates a schematic diagram of a process 30 in accordance with an embodiment of the present invention. The process 30 is utilized for setting a header of a PDU in an RLC layer of the wireless communications system 1000. The header comprises an HE field. The process 30 can be compiled into the header setting program code 220, and comprises the following steps:

Step 300: Start.

Step 302: Configure a "use of the special value of the HE field" mode.

Step 304: Set the HE field to indicate that a last octet of the PDU is a last octet of an SDU when the last octet of the PDU is the last octet of the SDU and there is no concatenation of SDUs inside the PDU.

Step 306: End.

According to the process 30, after the "use of the special value of the HE field" mode is configured, if the last octet of a PDU is the last octet of an SDU, and there is no SDU concatenation inside the PDU, the embodiment of the present invention sets the HE field of the PDU to indicate that the last octet of the PDU is the last octet of the SDU, e.g., setting the value of the HE field to [1 0]. In other words, after the "use of the special value of the HE field" mode is configured, if there is no SDU concatenation inside a PDU, and an SDU ends at the end of the PDU, the embodiment of the present invention will sets the HE field of the PDU to indicate that the last octet of the PDU is the last octet of the SDU. As a result, an extra PDU carrying the corresponding LI is not needed, so as to decrease overhead.

Therefore, via the process 30, after the "use of the special value of the HE field" mode is configured, if the last octet of a PDU is the last octet of an SDU, and there is no SDU concatenation inside the PDU, the embodiment of the present invention sets the HE field of the PDU to indicate that the last octet of the PDU is the last octet of the SDU. Oppositely, if the last octet of a PDU is the last octet of an SDU while there are concatenated SDUs inside the PDU, the embodiment of the present invention will not set the HE field of the PDU to indicate that the last octet of the PDU is the last octet of the SDU. As a result, the receiver will not wrongly reassemble the SDUs.

In summary, after the "use of the special value of the HE field" mode is triggered, if the last octet of a PDU is the last octet of an SDU, and there is no SDU concatenation inside the PDU, the embodiment of the present invention can set the HE field of the PDU to indicate that the last octet of the PDU is the last octet of the SDU. As a result, the embodiment of the present invention can reduce overhead, and prevent the receiver from wrongly reassembling SDUs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for setting a header, having a Header Extension Type (HE) field, of a protocol data unit (PDU) in a Radio Link Control (RLC) layer of a wireless communications system, the method comprising:

configuring a "use of the special value of the header extension type HE field" mode, wherein the HE field is a two-bit field (i) that is used by RLC Acknowledged Mode (AM), (ii) that can be used to indicate if a next octet is data or a combination of a Length Indicator (LI) and an Extension (E) bit, and (iii) that can be set to the special value to indicate that a last octet of the PDU is a last octet of a Service Data Unit (SDU) in the "use of the special value of the HE field" mode;

setting the HE field to the special value when the last octet of the PDU is the last octet of the SDU and there is no concatenation of SDUs inside the PDU; and not setting the HE field to the special value when the last octet of the PDU is the last octet of the SDU and there is concatenation of SDUs inside the PDU, wherein the HE field is set to indicate the next octet is data or the combination of the LI and the E bit when the last octet of the PDU is the last octet of the SDU and there is concatenation of SDUs inside the PDU.

2. The method of claim 1, wherein the special value is [1 0].

3. A communications device for setting a header, having a Header Extension Type (HE) field, Radio Link Control (RLC) protocol data unit (PDU) in a wireless communications system the communications device comprising:

a control circuit for realizing functions of the communications device;

a processor installed in the control circuit, for executing a program code to command the control circuit; and a memory installed in the control circuit and coupled to the processor for storing the program code;

wherein the program code comprises:

configuring a "use of the special value of the HE field" mode, wherein the HE field is a two-bit field (i) that is used by RLC Acknowledged Mode (AM), (ii) that can be used to indicate if a next octet is data or a combination of a Length Indicator (LI) and an Extension (E) bit, and (iii) that can be set to the special value to indicate that a last octet of the PDU is a last octet of a Service Data Unit (SDU) in the "use of the special value of the HE field" mode;

setting bits of the header extension type field the HE field to the special value when the last octet of the PDU is the last octet of the SDU and there is no concatenation of SDUs inside the PDU; and not setting the HE field to the special value when the last octet of the PDU is the last octet of the SDU and there is concatenation of SDUs inside the PDU, wherein the HE field is set to indicate the next octet is data or the combination of the LI and the E bit when the last octet of the PDU is the last octet of the SDU and there is concatenation of SDUs inside the PDU.

4. A communications device of claim 3, wherein the special value is [1 0].

5. A method for setting a header, having a Header Extension Type (HE) field, of a protocol data unit (PDU) in a Radio Link Control (RLC) layer of a wireless communications system, the method comprising:

configuring a "use of the special value of the HE field" mode, wherein the HE field is a two-bit field (i) that is used by RLC Acknowledged Mode (AM), (ii) that can be used to indicate if a next octet is data or a combination of a Length Indicator (LI) and an Extension (E) bit, and (iii) that can be set to the special value to indicate that a last octet of the PDU is a last octet of a Service Data Unit (SDU) in the "use of the special value of the HE field" mode;

setting the HE field to the special value when the last octet of the PDU is the last octet of the SDU and there is no concatenation of SDUs inside the PDU regardless of whether the SDU is segmented or not; and not setting the HE field to the special value when the last octet of the PDU is the last octet of the SDU and there is concatenation of SDUs inside the PDU, wherein the HE field is set to indicate the next octet is data or the combination of the LI and the E bit when the last octet of the PDU is the last octet of the SDU and there is concatenation of SDUs inside the PDU.

6. The method of claim 5, wherein the special value is [1 0].

7. A communication device for setting a header, having a Header Extension Type (HE) field, of a protocol data unit (PDU) in a Radio Link Control (RLC) layer of a wireless communication system, the communication device comprising:

a control circuit for realizing functions of the communications device;

a processor installed in the control circuit, for executing a program code to command the control circuit; and a memory installed in the control circuit and coupled to the processor for storing the program code;

wherein the program code comprises:

configuring a "use of the special value of the HE field" mode, wherein the HE field is a two-bit field (i) that is used by RLC Acknowledged Mode (AM), (ii) that can be used to indicate if a next octet is data or a combination of a Length Indicator (LI) and an Extension (E) bit, and (iii) that can be set to the special value to indicate that a last octet of the PDU is a last octet of a Service Data Unit (SDU) in the "use of the special value of the HE field" mode;

setting the HE field to the special value when the last octet of the PDU is the last octet of the SDU and there is no concatenation of SDUs inside the PDU regardless of whether the SDU is segmented or not; and not setting the HE field to the special value when the last octet of the PDU is the last octet of the SDU and there is concatenation of SDUs inside the PDU, wherein the HE field is set to indicate the next octet is data or the combination of the LI and the E bit when the last octet of the PDU is the last octet of the SDU and there is concatenation of SDUs inside the PDU.

8. The communication device of claim 7, wherein the special value is [1 0].

* * * * *